United States Patent Office 3,159,551
Patented Dec. 1, 1964

3,159,551
METHOD OF MALTING WITH THE AID OF GIBBERELLIC ACID
Evald Sandegren, Sara Moreas Vag 134, Enskede, Sweden, and Horst Beling, Stamgatan 32, Alvsjo, Sweden
No Drawing. Continuation of abandoned application Ser. No. 763,189, Sept. 25, 1958. This application July 19, 1962, Ser. No. 211,085
7 Claims. (Cl. 195—70)

This application is a continuation of our pending patent application Serial No. 763,189, filed September 25, 1958, entitled "Process for Use in the Manufacture of Malt and/or Malt Enzyme Preparations," now abandoned.

This invention concerns a process for the manufacture of malt and/or malt enzyme preparations. More precisely it concerns a process for the manufacture of malt using the well-known action of gibberellin on plant growth. Still more precisely it concerns a process characterised by successive additions of gibberellin either intermittently or continuously in the steeping and/or malting of grain, for example barley or wheat. Still more closely defined it refers to a process of this sort used in the presence of oxygen, for example as air, and of water or possibly also in the presence of an additional supply of oxygen and/or water. This process which can be used in different ways, the principles of which are described in the following, can also be carried out in combination with the addition of salts and/or other nutrients and/or activators and/or supplementary plant horomones, for example indolylacetic acid and auxin.

After having thus described the main object of the invention, a more detailed description will be given.

Gibberellin is probably a plane hormone with effects that are supplementary to rather than comparable with the effects of auxin on macro-organisms. It is usually prepared from a fungus that causes a special disease, "bakanae disease," in rice on which it was first discovered. This fungus has been given various names of which "*Gibberella fujikuroi*" and "*Fusarium moniliforme*" are the most common. From a cell-free filtrate of the fungus, two main fractions have been prepared in crystalline form, gibberellin A and gibberellin B. From gibberellin A there have been isolated four individual components, gibberellins $A_1$, $A_2$, $A_3$ and $A_4$. Gibberellin $A_3$ has also been termed gibberellinic acid or better gibberellic acid.

Attempts have been made earlier, though only on a laboratory scale to utilise the plant hormone properties of gibberellin in the malting of various types of grain. The results have been very variable. It has been shown that there is an increase in the activity of some enzymes but in some cases there has been at the same time a decrease in the activity of other enzymes. In most cases the addition of relatively large doses of gibberellin has given a small increase in the yield of extract but has given high malting losses.

From a very large number of experiments it has been concluded

That gibberellin has a certain growth promoting effect though it has not been possible to determine the nature of the effect or to control its mechanism and That up to the present time no procedure has been devised for the practical utilisation of these growth hormone properties.

The present invention concerns just such a practical, useful and economic procedure. By the use of this process, it has been possible to shorten the steeping time by not less than 50–65 percent and the malting time by not less than 40 percent of the times usually required and in spite of this to obtain an increase of 2 percent in the extract yield (approximately 3 percent relative increase) without increased malting losses. The fermentation of malted barley prepared in this way has been found to proceed more readily than usual. Among the further advantages that can be obtained may be mentioned particularly that a good malt can be obtained even with grain of imperfect quality.

This completely surprising result has been obtained by the addition to the grain during steeping and/or malting of gibberellin in amounts of 1–4 g. per ton of grain either intermittently or continuously in the presence of air and moisture. Results that are particularly favourable from the aspects described above have been obtained by a process in which steeping was terminated and malting was begun at subnormal water contents ($<40\%$) and the remaining water required was added successively by pouring on or spraying, especially by the spray method. Since the most important point seems to be the addition of successive amounts of gibberellin either intermittently or continuously the invention includes the supply of gibberellin in solid form, for example by blowing or dusting while the air and water are supplied separately. In certain cases the gibberellin can be added to water already present and/or added. If necessary the supply of air required can be blown in.

Spraying can, for example, be done in between the operations of turning the grain, either continuously or several times a day in which case the amounts sprayed can be adjusted to correspond with that described above. The grain should be turned carefully and care should be taken that it is well moistened through.

The invention concerns primarily the preparation of barley malt but other sorts of grain, for example wheat, can also be used.

The invention also concerns primarily the use of gibberellic acid (gibberellin $A_3$) but the invention also includes the use of other gibberellin components—and mixtures of these in different proportions either with each other and/or with gibberellic acid.

Finally the invention also refers primarily, in the case where spraying with gibberellic solution is used, to a concentration of approximately 1 mg. of gibberellin in 100 g. of water but this concentration can be varied according to the time, quantity and the method of spraying which may be intermittent or continuous and may also need to be adjusted according to the sort of grain used.

The explanation of the large, advantageous especially from the economic point of view, and completely surprising effect obtained by the use of this process can perhaps be sought in the natural and continuous development of the growth of the grain without any temporary spurts which the process makes possible. A number of circumstances should be taken into account, for example the extent to which the respiration of the seed is possible, but the process is of course quite independent of the greater or lesser reliability of the explanations which can be put forward of the effects obtained.

Example

According to one form of the invention the grain is steeped for 24 hours to a water content of 38–39 percent at 16–17° C. After this is malted, for example for 5 days at an average temperature of about 13° C. during which time it is sprayed twice a day for the first 3–4 days with a solution in water of 1 part of gibberellic acid in 100,000 parts of water and very carefully turned. It can be dried at 68° C.

Trial runs on a semi-industrial scale of the malting of barley under these conditions gave the results shown in the following table:

| Barley Variety | G-acid, mg./kg. of barley | Extract, percent dry matter | Extract diff. coarse fine | Soluble Nitrogen percent | Diast. Power | α-amylase activity | Cellulase activity | Proteinase activity |
|---|---|---|---|---|---|---|---|---|
| Beka | 0 | 81.7 | 3.3 | 45 | 505 | 45 | 435 | 130 |
|  | 16 | 83.7 | 1.4 | 59 | 540 | 65 | 615 | 135 |
| Ingrid | 0 | 80.5 | 5.6 | 36 | 235 | 35 | 300 | 100 |
|  | 11 | 82.8 | 3.9 | 53 | 295 | 55 | 410 | 120 |
| Herta | 0 | 80.1 | 6.5 | 37 | 410 | 33 | 250 | 105 |
|  | 1 | 81.4 | 4.2 | 48 | 465 | 47 | 290 | 115 |
|  | 5 | 82.7 | 3.3 | 55 | 480 | 53 | 325 | 115 |
|  | 10 | 82.8 | 3.7 | 55 | 480 | 53 | 325 | 120 |
| Herta | 0 | 79.7 | 7.9 | 34 | 385 | 32 | 300 | 110 |
|  | 2 | 81.5 | 4.6 | 48 | 465 | 51 | 435 | 115 |
|  | 3 | 82.2 | 4.0 | 50 | 450 | 51 | 510 | 115 |
|  | 4 | 82.1 | 3.7 | 49 | 470 | 52 | 540 | 120 |

As is apparent from the table, the results varied within certain limits with the quantity of gibberellic acid added per unit weight of grain. However, even 1 mg. per kg. gives all the advantages described above. It should be emphasized especially that there is an appreciable increase in the activity of all the enzymes. Associated with this is a better break-down of the cell walls of the grain and the production of a qualitatively good malt even with grain of inferior quality.

In trials with the last type of barley listed in the table (Herta) the diastase effect increased on the average by about 20%, the α-amylase activity by about 60 percent, the cellulase activity by about 90 percent and the proteinase activity by about 10–15 percent.

The steeping and malting times were shortened as described above but nevertheless the total extract yield increased by about 2 percent. It can also be pointed out in this connection that the soluble nitrogen increased by about 45 percent and that there was no increase in the malting losses.

What is claimed as new and desired to be secured by Letters Patent is:

1. A method of producing malt and malt enzyme preparations comprising the steps of steeping a grain under steeping temperature conditions in water to a sub-normal water content of less than the normal water content of at least 40% but sufficient for said grain to be malted under malting conditions; and subjecting the thus sub-normally steeped grain to malting under malting temperature conditions while adding water to said normal water content and also adding successive small amounts of gibberellic acid until the total amount of said added gibberellic acid is sufficient to promote the growth of said grain but does not exceed 4 mg. per each kg. of said grain, said malting being continued until said grain is adequately malted so as to decrease the total time required to obtain a malt while obtaining a malt of balanced composition in high yield.

2. A method of producing malt and malt enzyme preparations comprising the steps of steeping a grain under steeping temperature conditions in water to a sub-normal water content of slightly less than the normal water content of at least 40%; and subjecting the thus sub-normally steeped grain to malting under malting temperature conditions while adding water to a normal water content and also adding successive small amounts of gibberellic acid in the form of an aqueous solution of said gibberellic acid until the total amount of said added gibberellic acid is sufficient to promote the growth of said grain, said malting being continued until said grain is adequately malted but does not exceed 4 mg. per each kg. of said grain so as to decrease the total time required to obtain a malt while obtaining a malt of balanced composition in high yield.

3. A method of producing malt and malt enzyme preparations, comprising the steps of steeping a grain at a temperature of about 16–17° C. in water to a sub-normal water content of slightly less than the normal water content of at least 40%; and subjecting said steeped grain to malting at an average temperature of about 13° C. while successively adding an aqueous solution of gibberellic acid until the total amount of water is equal to the normal amount of more than 40% and the total amount of said added gibberellic acid is between 1–4 mg. per each kg. of grain, said malting being continued until said grain is adequately malted so as to decrease the total time required to obtain a malt while obtaining a malt of balanced composition in high yield.

4. In a method of producing malt and malt enzyme preparations, the steps of steeping grain at a temperature of about 16–17° C. for about twenty-four hours to 38–39% water content; and subjecting said steeped grain to malting for about five days at an average temperature of about 13° C. while successively adding thereto an aqueous solution of gibberellic acid until the total quantity of gibberellic acid corresponds to 1–4 mg. per each kg. of grain.

5. In a method of producing malt and malt enzyme preparations, the steps of stepping grain at a temperature of about 16–17° C. for about twenty-four hours to 38–39% water content; and subjecting said steeped grain to malting for above five days at an average temperature of about 13° C. while successively adding thereto an aqueous solution containing approximately 1 mg. of gibberellic acid per each 100 g. of water until the total quantity of gibberellic acid corresponds to 1–4 mg. per each kg. of grain.

6. A method of producing malt and malt enzyme preparations, comprising the steps of steeping a grain under steeping temperature conditions in water to a sub-normal water content of about 38–39%; and subjecting the thus sub-normally steeped grain to malting under malting temperature conditions while adding water to a normal water content of more than about 40% and also adding successive small amounts of gibberellic acid until the total amount of said added gibberellic acid is sufficient to promote the growth of said grain but does not exceed 4 mg. per each kg. of said grain, said malting being continued until said grain is adequately malted so as to decrease the total time required to obtain a malt while obtaining a malt of balanced composition in high yield.

7. A method of producing malt and malt enzyme preparations, comprising the steps of steeping a grain at a temperature of about 16–17° C. in water to a sub-normal water content of about 38–39%; and subjecting the thus sub-normally steeped grain to malting at an average temperature of about 13° C. while adding an aqueous solution of gibberellic acid until the total amount of water is equal to a normal water content of more than 40% and the total amount of said added gibberellic acid is sufficient to promote the growth of said grain but does not exceed 4 mg. per each kg. of said grain, said malting being continued until said grain is adequately malted so as to decrease the total time required to obtain a malt while obtaining a malt of balanced composition in high yield.

References Cited in the file of this patent

UNITED STATES PATENTS

| | | |
|---|---|---|
| 500,305 | Tilden | June 27, 1893 |
| 2,842,051 | Brian et al. | July 8, 1958 |
| 2,901,401 | Grimm et al. | Aug. 25, 1959 |
| 2,943,938 | Zeeuw | July 5, 1960 |